E. M. COLE.
PLANTER.
APPLICATION FILED FEB. 7, 1917. RENEWED OCT. 13, 1921.

E. M. Cole, Inventor

E. M. COLE.
PLANTER.
APPLICATION FILED FEB. 7, 1917. RENEWED OCT. 13, 1921.
1,398,066. Patented Nov. 22, 1921.
4 SHEETS—SHEET 3.
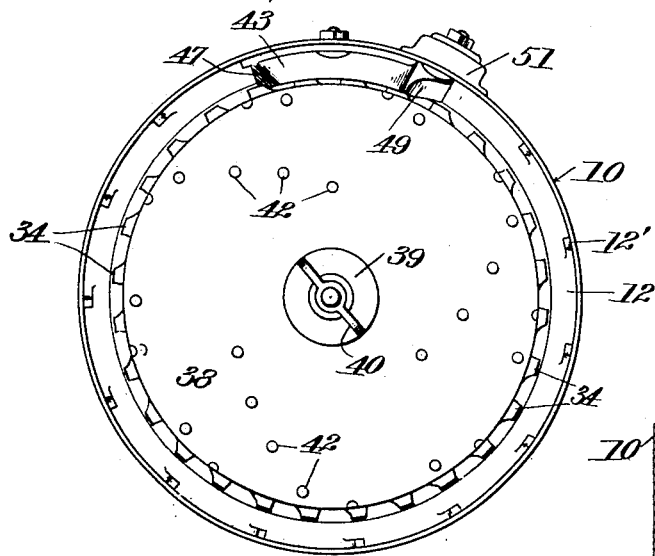
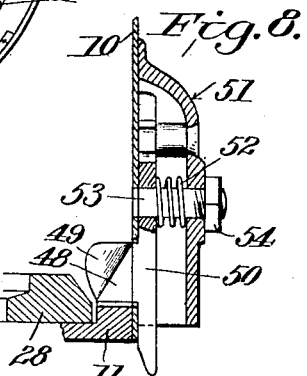
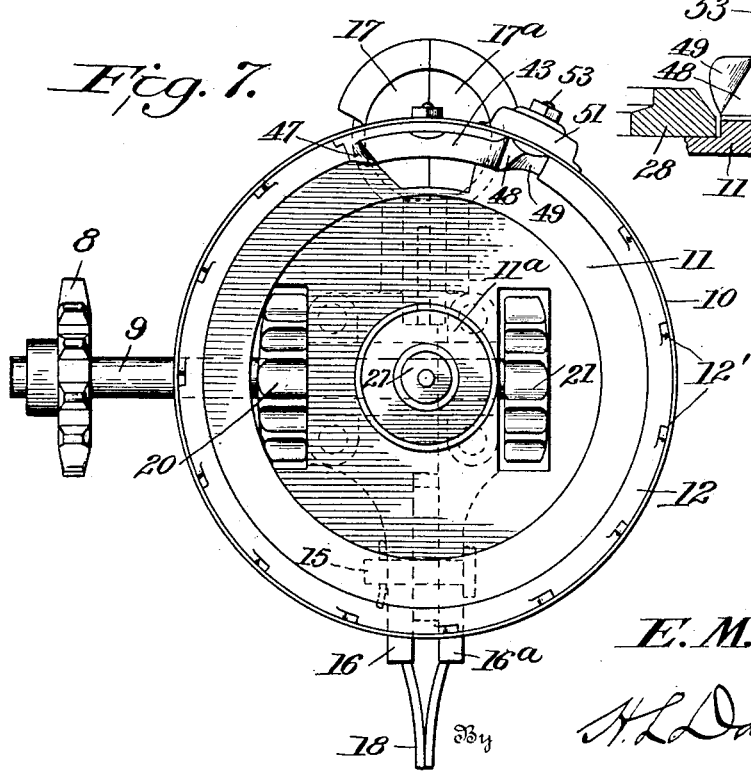

E. M. COLE.
PLANTER.
APPLICATION FILED FEB. 7, 1917. RENEWED OCT. 13, 1921.

1,398,066.

Patented Nov. 22, 1921.

Inventor
E. M. Cole.
By H. L. Davis
Attorney

UNITED STATES PATENT OFFICE.

EUGENE MACON COLE, OF CHARLOTTE, NORTH CAROLINA.

PLANTER.

1,398,066. Specification of Letters Patent. Patented Nov. 22, 1921.

Application filed February 7, 1917, Serial No. 147,153. Renewed October 13, 1921. Serial No. 507,568.

*To all whom it may concern:*

Be it known that I, EUGENE M. COLE, a citizen of the United States, residing at Charlotte, in the county of Mecklenburg and State of North Carolina, have invented certain new and useful Improvements in Planters, of which the following is a specification.

This invention relates to seeders and planters, and more particularly to machines adapted to plant a single row of such seeds as corn and cotton.

One object of the invention is to provide an improved seed dropping mechanism which shall be exceedingly simple in construction and positive and accurate in operation. A further object is to provide seed dropping mechanism capable of successfully handling cotton seed without clogging.

A still further object is to provide improved means for throwing the seed dropping mechanism into and out of gear with the driving mechanism.

With these and other objects in view which will hereinafter appear, the invention consists in the construction and combination of parts described and claimed herein and shown in the accompanying drawings, in which, Figure 1 is a side elevation of my improved planter complete;

Fig. 6 is a plan view of the hopper showing the cap plate equipped with spurs;

Fig. 7 is a similar view but with the cap plate and seed ring removed, showing the driving mechanism;

Fig. 8 is a detailed section on an enlarged scale, showing the improved wiper mechanism;

Figure 1:
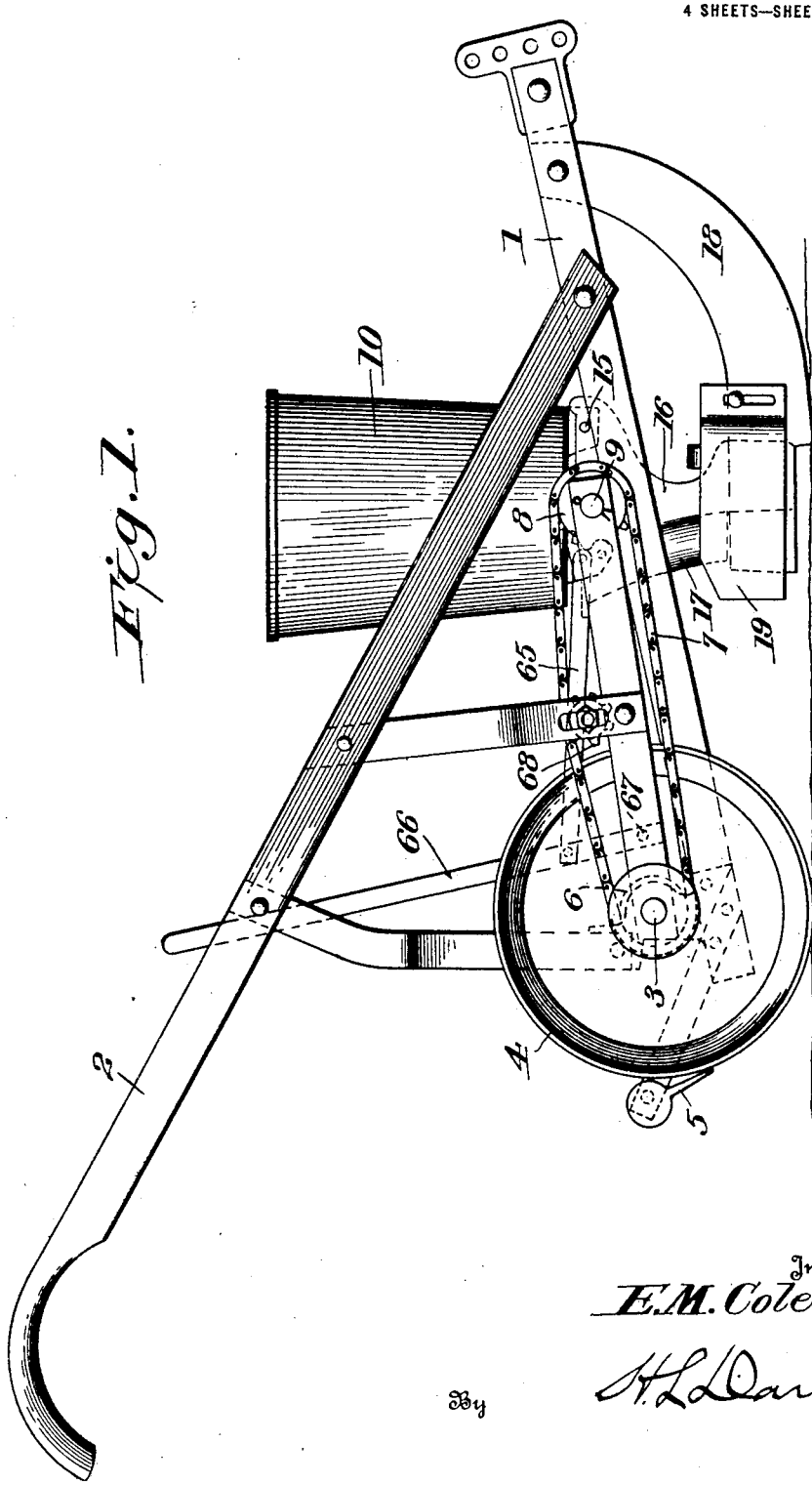

Referring to the drawings in detail, my improved planter comprises the frame 1, handles 2, ground wheel 4 mounted on the spindle 3, and scraper 5, coöperating with the wheel 4. A sprocket wheel 6 is rigidly secured to the shaft 3 and turns with the ground wheel. A sprocket chain 7 engages the wheel 3 and serves to drive a sprocket wheel 8, mounted on a shaft 9 and serving to operate the seed dropping mechanism hereinafter described. An idler 68, for supporting the sprocket chain 7 intermediate its ends, may be employed if desired. The parts so far described may be of the usual or any desired construction.

10 designates the seed hopper which is preferably of sheet metal and cylindrical in form. It is secured at its lower edge to a bottom plate 11, which is provided with an upstanding flange 12. The preferred method of connecting the hopper 10 to the bottom plate is by means of slight projections 13, formed on the flange 12, which extend into corresponding openings in the hopper body.

To the bottom plate 11, near one side, is secured a fin 14, which is pivotally mounted on a pin 15, so that the hopper may be rocked about this pin as an axis. The pin 15 is mounted in and supported by the two halves 16—16$^a$ of a casting secured to the frame underneath the hopper and containing the seed chute or boot 17—17$^a$. The two halves of the casting are shaped to form a recess to receive the fin 14. A furrow opener or sword 18 extends in front of the casting 16 and is secured to the frame 1 in the usual manner, wings or spreaders 19 being provided on either side of the seed chute.

The shaft 9 is journaled in bearings supported by the casting 16, and secured to this shaft beneath the hopper is a pair of gear wheels 20 and 21, spaced as shown in Fig. 7. These wheels mesh respectively with annular series of teeth 22 and 24, (see Fig. 2). The teeth 24 project from the bottom of a casting 25, which is provided with a central hub 26, journaled upon a boss 27, projecting up from the bottom plate 11. The teeth 22 project downwardly from the lower face of a driving plate 23, the function of which is to drive the seed ring 28, as will now be described.

In the bottom plate 11 is formed an annular runway having a flat bottom and a vertical outer wall 29. From the top of the wall 29, the flange 12 is shaped to form an upwardly and outwardly inclined surface 30, as clearly shown in Fig. 2.

Figure 9:
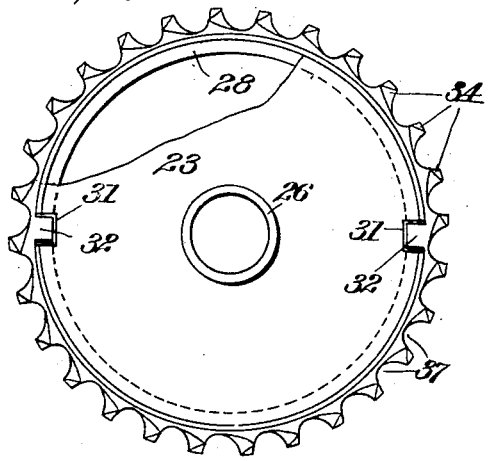
Fig. 9 is a plan view of one of the seed rings and its associated driving plate.

Referring to Fig. 9, it will be seen that the driving plate 23 is provided with a pair of diametrically opposite notches 31, which are adapted to engage correspondingly placed lugs 32, formed on the seed ring 28. These notches and lugs serve to form a driving connection between the plate 23 and the seed ring.

Figure 10:
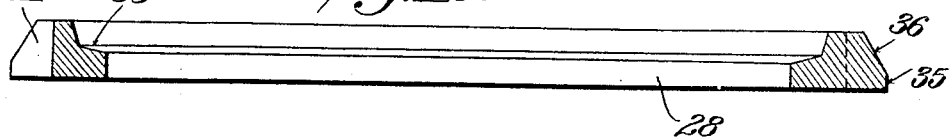
Fig. 10 is a transverse section on an enlarged scale, showing the ring itself.

The seed ring and the profile of the teeth carried thereby are of special design. The inside of the ring is provided with the groove 33, to receive the plate 23, and on the outer periphery of the ring is formed a series of teeth 34, all lying in the plane of the ring. As clearly shown in Fig. 10, the lower portion of the outer edge of these teeth is vertical, as indicated at 35, and works against the vertical portion 29 of the runway. The upper portion of such teeth, however, is cut away or beveled off at an angle to the plane of the ring, as indicated at 36 in Fig. 10. Between the teeth 34 are formed seed receiving pockets 37, as will be apparent from an inspection of Fig. 9, and the surface of the runway itself constitutes the bottom of these pockets.

Mounted concentrically and superposed upon the seed ring is a dome-shaped cap 38. This cap has a squared opening which fits over the similarly shaped upper end of the hub 26 and therefore turns therewith. The parts are held in assembled relation by means of a washer 39 and wing nut 40, as will be apparent. The cap 38 is of slightly less diameter than the feed ring, including the teeth, and therefore such teeth project slightly beyond the periphery 41 of the cap. Such cap, however, overhangs the inner portion of the pockets 37, formed between the teeth, and aids in retaining the seed in proper position within such pockets.

Figure 2:
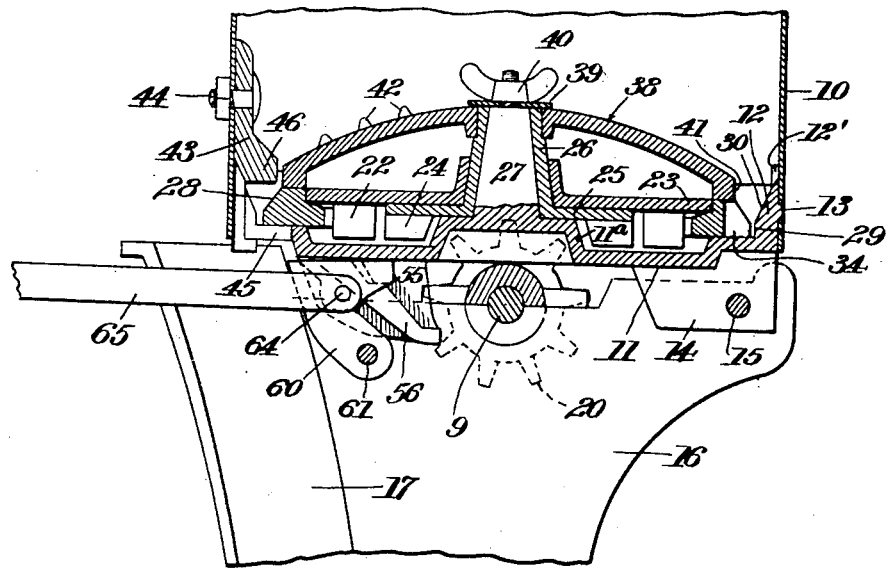
Fig. 2 is an enlarged vertical section through the seed dropping mechanism and associated parts.

I find it desirable, especially in planters for handling cotton seed, to form upon the upper surface of the cap 38 a plurality of spurs or projections 42, as shown in Figs. 2 and 6. These spurs, when the cap is rotated, serve to agitate the mass of seed and cause them to flow freely.

Referring again to Fig. 2, it will be seen that the periphery of the cap 38 and teeth 34, together with the inclined wall 30 of the hopper, form an annular V-shaped seed receiving trough. The shape of the cap and its rotation serve to feed the seed uniformly into this trough so that the proper filling of the seed pockets is always assured.

In order to prevent clogging of the seed, or the delivery of too great a number of seed at a time through the discharge opening 45, I provide a wiper mechanism which will now be described. This mechanism includes a guard 43 secured to the inside of the hopper just above the discharge opening 45, as by means of a bolt 44. This guard overhangs the outer ends of the teeth 34 and is shaped to fit the periphery of the cap 38, as shown in Fig. 6. This guard is somewhat arch shaped and has inclined ends. Adjacent that end of the guard toward which the seed are fed, I provide a wiper 48, having an inclined concave surface 49. As will be seen by reference to Figs. 6, 7, and 8, the shape and location of this wiper are such that it projects toward the runway into the path of the moving seed so that only a small clearance is left between such wiper and the ends of the teeth 34. As a result, any superfluous seed which are partly lodged within the pockets are removed from such pockets by the wiper and are caused to ride upwardly along the concave surface 49 on to the guard 43. From the other side of the guard such seed pass again into the pockets and are carried around by the ring. In order to prevent jamming and possibly breaking of the seed, the wiper 48 is yieldingly supported. This may be conveniently accomplished by securing the wiper 48 to a plate 50 arranged outside of the hopper 10 in a housing 51. The plate is held in engagement with the hopper by means of a spring 52, surrounding a bolt 53, secured to the plate 50 and held in position by means of a nut 54. In this way, should too great a pressure be applied to the wiper, the spring 52 will permit it to yield until the pressure is relieved.

From the foregoing, it will be understood that as the ground wheel rolls along the sprocket chain 7 drives the sprocket wheel 8 and shaft 9, thus turning the gear wheels 20 and 21. These gear wheels, engaging the teeth 22 and 24 on opposite sides of the center, will cause the seed ring 28 and the cap 38 to revolve in opposite directions. Preferably, a series of teeth 12' is arranged to extend upwardly from the flange 12 inside the hopper. These teeth, in connection with the rotating cap, carrying the spurs 42, assist in the feeding and breaking up of the mass of seed and insure its uniform distribution to the seed pockets.

Figure 3:
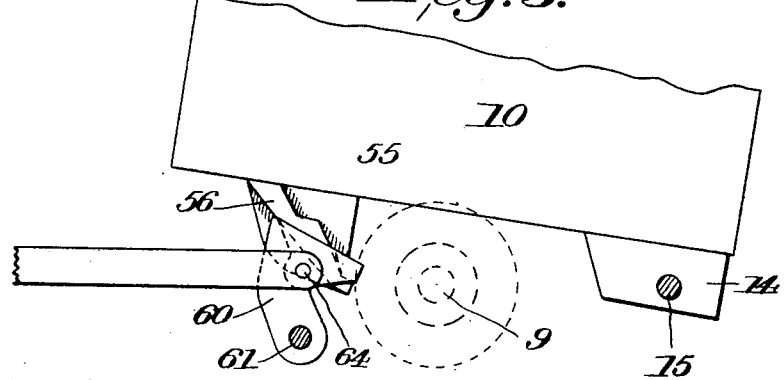
Fig. 3 is a fragmentary side elevation showing the means for raising and lowering the hopper.
Figure 4:
Figs. 4 and 5 are reverse elevations showing the cam bracket and operating dog hereinafter described.
Figure 5:
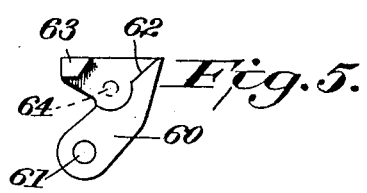

As will be understood, the rocking of the hopper 10 about the pivot pin 15, as indicated in Fig. 3, serves to lift the teeth 22 and 24 out of engagement with the corresponding gear wheels 20 and 21. In other words, the driving connection between the shaft 9 and the seed dropping mechanism is controlled by the position of the hopper on its pivot. In order to thus shift the hopper so as to throw the mechanism into and out of gear, I provide the specially designed cam and dog devices shown in Figs. 3, 4, and 5. A bracket 55 is secured to the bottom of the hopper, and is provided on one face with a cam rib 56. This rib has a straight inclined under surface 57, and on its upper surface is provided with a pair of shoulders 58 and 59.

A swinging dog 60, pivoted at 61 to the casting 16, is arranged to coöperate with the cam bracket just described. This dog has a recess adapted to embrace the rib 56 of the bracket and is provided with a smooth bearing surface 62, adapted to engage the surface 57 of the cam rib. The dog 60 also has an angularly faced lug 63 which is adapted to engage the shoulders 58 and 59 of the cam rib. When the parts are in the position shown in Fig. 2, the wheels and toothed members are in gear and the lug 63 rests upon the shoulder 58. It will be seen that the hopper is thus locked in operative position and cannot be lifted or jolted out of place. When, however, the dog 60 is swung about the pivot 61 into the position shown in Fig. 3, the surface 62 rides down the surface 57 and this elevates the hopper until the lug 63 engages the shoulder 59. This acts as a stop to lock or hold the parts in inoperative position. It will thus be seen that the hopper can be readily shifted from one position to the other by means of the swinging dog and cam bracket and that it is locked or held in both positions.

In order that the operator may conveniently shift the bracket 60 so as to throw the machine into and out of gear, I provide a link 65 pivoted at one end to a pin 64, secured to the dog 60, and at the other end to a lever 66, pivoted at 67 to the frame of the machine. By moving this lever forward from the position shown in Fig. 1, the hopper may be elevated, as shown in Fig. 3, and the driving mechanism thrown out of gear.

Figure 11:
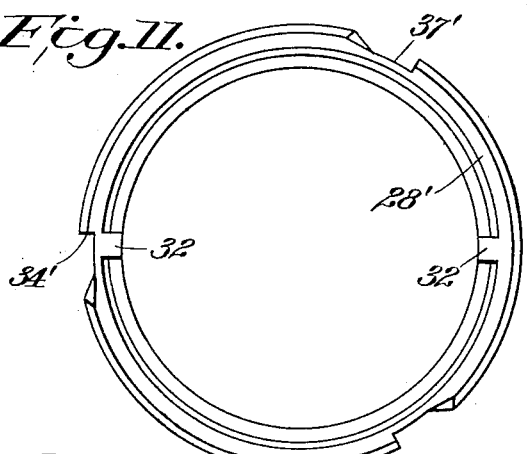
Fig. 11 is a plan view of a different form of seed ring.
Figure 12:
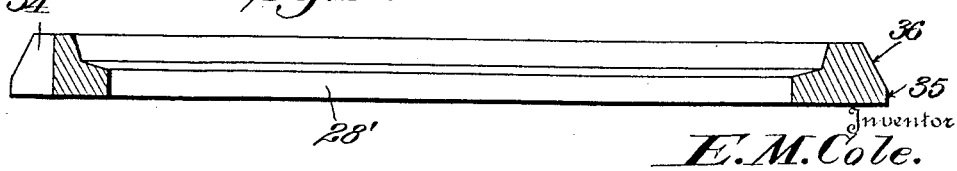
Fig. 12 is a transverse section thereof on an enlarged scale.

The form of seed ring shown in Fig. 9 is more especially designed for planting cotton and other seed which are to be dropped relatively close together. For planting corn, a seed ring such as shown in Figs. 11 and 12 is employed. This ring has only a few teeth 34′ with a corresponding number of pockets 37′, and this results in dropping the seed at relatively greater distances apart. It will be understood that any desired spacing of the seed may be readily obtained by selecting any one of a set of interchangeable seed rings.

It will be noted that with both forms of seed ring, the thickness of the teeth is much greater than the height of the vertical outer wall 29, (see Fig. 2), and that this wall terminates and inclined wall 30 begins at a point between the upper and lower faces of such teeth. The result of this is that the upper portions of the seed cells 37 are open at the side as well as the top, to facilitate entrance thereinto of the seed, which slide down the inclined wall 30, while the lower portions of the cells are closed at the side by the vertical wall 29, thus confining the selected seeds therein.

What I claim is:

1. In a planter, a hopper having a bottom plate formed with an annular runway, said runway having a discharge opening therethrough, a flat seed ring rotatably mounted in said runway and having horizontally projecting peripheral teeth, the lower portion of said teeth having an outer vertical face, while the upper portion is beveled off uniformly on a concentric arc and at an angle to the plane of the ring, whereby an annular trough is formed for the reception of the seed.

2. In a planter, a hopper having a bottom formed with an annular runway, said runway having a vertical outer wall, and an outwardly inclined wall extending upwardly therefrom, a flat seed ring rotatably mounted in said runway and having peripheral teeth, the lower portion of said teeth having a vertical outer face working against the vertical wall of said runway, and the upper portion having an inwardly inclined face disposed on an arc concentric with the ring, such inwardly inclined faces of the teeth forming with the said outwardly inclined wall an annular V-shaped trough for the reception of the seed.

3. In a planter, a hopper having a bottom formed with an annular runway, a seed ring rotatably mounted in said runway, an outwardly inclined fixed wall surrounding said seed ring, and a series of vertically projecting teeth located at the top of such wall above the seed ring.

4. In a planter, a hopper having a bottom plate formed with an annular runway, and provided with a discharge opening adjacent said runway, a seed ring rotatably mounted in said runway, and having peripheral teeth lying in the plane of the ring, and a device for limiting the number of seed carried by said teeth to the discharge opening, said device comprising a guard disposed above said opening and overhanging said teeth, and a wiper adjacent one end of the guard projecting downwardly toward said runway and having a concave face adapted to elevate surplus seed from said runway and deliver them on the top of said guard.

5. In a planter, a hopper having a bottom plate formed with an annular runway, and provided with a discharge opening adjacent said runway, a seed ring rotatably mounted in said runway, and having peripheral teeth lying in the plane of the ring, and a device for limting the number of seed carried by said teeth to the discharge opening, said device comprising a fixed guard disposed above said opening and overhanging said teeth, and a spring pressed wiper disposed in the path of the seed adjacent one end of said guard, and serving to elevate surplus seed from the runway and deliver them on to said guard, said wiper being mounted for movement radially of said ring.

6. In a planter, a hopper having a bottom formed with an annular runway, a seed ring rotatably mounted in said runway, said ring having peripheral teeth lying in the same plane and forming seed receiving pockets between them, said runway constituting the bottom of said pockets, a cap mounted concentrically of and overlying said seed ring, said cap being of such diameter as to overhang the inner portions of the seed pockets, leaving the teeth projecting beyond its periphery, the upper portion of such projecting teeth being beveled off to form with the cap and hopper an annular seed receiving trough, and means for rotating said cap and ring in opposite directions.

7. In a planter, a hopper having a bottom formed with an annular runway and provided with a discharge opening adjacent said runway, a seed ring rotatably mounted in said runway and having peripheral seed receiving pockets, said runway constituting the bottom of said pockets, a cap mounted above said ring with its edge overhanging said seed pockets, a wiper device comprising a guard located above said discharge opening and overhanging the outer portion of said seed pockets, the inner surface of said guard being shaped to fit and lying adjacent to the periphery of said cap, and means for rotating said cap and seed ring in oposite directions.

8. In a planter, a hopper having a bottom plate formed with an annular runway, said runway having a vertical outer wall, and an outwardly inclined wall extending upwardly therefrom, a seed ring rotatably mounted in said runway and having peripheral teeth disposed substantially wholly in the plane of the ring and forming seed cells between them, a cap mounted concentrically above said ring with its edge projecting over the seed cells, the lower portion of said teeth having a vertical outer face working against the vertical wall of said runway, the upper portion of said teeth projecting above the top of such vertical wall but lying wholly below the edge of said cap, said vertical wall terminating and said outwardly inclined wall beginnig at a point between the upper and lower faces of the said cell-forming teeth, whereby the upper portions of the seed cells, adjacent the edge of said cap, are open at the sides as well as the top, to facilitate the entrance of seed thereinto, and the lower portions of the cells are closed at the sides so as to confine the selected seed therein.

In testimony whereof I have affixed my signature.

EUGENE MACON COLE.